US008773971B2

(12) United States Patent
Kim et al.

(10) Patent No.: US 8,773,971 B2
(45) Date of Patent: Jul. 8, 2014

(54) METHOD AND APPARATUS FOR TRANSMITTING/RECEIVING A SIGNAL IN A WIRELESS COMMUNICATION SYSTEM

(75) Inventors: Hak Seong Kim, Anyang-si (KR); Han Byul Seo, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 274 days.

(21) Appl. No.: 13/376,733

(22) PCT Filed: Jun. 8, 2010

(86) PCT No.: PCT/KR2010/003668
§ 371 (c)(1),
(2), (4) Date: Dec. 7, 2011

(87) PCT Pub. No.: WO2010/143868
PCT Pub. Date: Dec. 16, 2010

(65) Prior Publication Data
US 2012/0076071 A1    Mar. 29, 2012

Related U.S. Application Data

(60) Provisional application No. 61/185,181, filed on Jun. 8, 2009.

(30) Foreign Application Priority Data

Jun. 8, 2010   (KR) .................. 10-2010-0053905

(51) Int. Cl.
*H04J 11/00*   (2006.01)
*H04W 4/00*   (2009.01)
(52) U.S. Cl.
USPC ............................ 370/208; 370/315; 370/328

(58) Field of Classification Search
USPC ......... 370/208, 315, 328, 330, 334, 337, 347, 370/468
See application file for complete search history.

(56) References Cited

U.S. PATENT DOCUMENTS

| 8,073,061 B2* | 12/2011 | Horiuchi et al. .............. 375/260 |
| 2006/0209671 A1* | 9/2006 | Khan et al. .................... 370/208 |
| 2007/0291696 A1* | 12/2007 | Zhang et al. .................. 370/331 |
| 2008/0063097 A1* | 3/2008 | Horiuchi et al. .............. 375/260 |

(Continued)

OTHER PUBLICATIONS

"Resource Allocation and Downlink Control Channel Structure for Relay Backhaul Link," 3GPP TSG RAN WG1 Meeting #56bis R1-091194, LG Electronics, Mar. 23 to 27, 2009.

(Continued)

*Primary Examiner* — Andrew Lee
(74) *Attorney, Agent, or Firm* — Birch, Stewart, Kolasch & Birch, LLP

(57) ABSTRACT

A method and an apparatus for receiving or transmitting a signal of a relay station in a wireless communication system are provided. The relay station receives or transmits a signal using radio resources indicated by backhaul resource allocation information. In this case, the radio resources include a plurality of symbols in a time domain, and the plurality of symbols have boundaries which are shifted based on symbols included in a frequency band allocated to a macro user equipment. And the radio resources include a plurality of subcarriers in a frequency domain, and at least one subcarrier adjacent to the frequency band allocated to the macro user equipment among the plurality of subcarriers is set to a guard subcarrier.

10 Claims, 18 Drawing Sheets

(56) References Cited

U.S. PATENT DOCUMENTS

| | | |
|---|---|---|
| 2008/0070582 A1 | 3/2008 | Cai |
| 2009/0061899 A1* | 3/2009 | Hwang et al. ............. 455/456.2 |
| 2012/0009867 A1* | 1/2012 | Hwang et al. ..................... 455/7 |
| 2013/0083705 A1* | 4/2013 | Ma et al. ....................... 370/280 |

OTHER PUBLICATIONS

"Spectrum Aggregation Operations—UE Impact Considerations," 3GPP TSG RAN WG1 Meeting #55 R1-084405, Motorola, Nov. 10 to 14, 2008, pp. 1 to 5.

* cited by examiner

METHOD AND APPARATUS FOR TRANSMITTING/RECEIVING A SIGNAL IN A WIRELESS COMMUNICATION SYSTEM

CROSS REFERENCE TO RELATED APPLICATIONS

This application is the National Phase of PCT/KR2010/003668 filed on Jun. 8, 2010, which claims priority under 35 U.S.C. §119(e) to U.S. Provisional Application No. 61/185,181 filed on Jun. 8, 2009 and under 35 U.S.C. §119(a) to Patent Application No. 10-2010-0053905 filed in the Republic of Korea on Jun. 8, 2010, all of which are hereby expressly incorporated by reference into the present application.

TECHNICAL FIELD

The present invention relates to wireless communications, and more particularly, to a method and apparatus for transmitting and receiving a signal in a wireless communication system employing a relay station.

BACKGROUND ART

Standardization works of international mobile telecommunication (IMT)-advanced which is a next generation (i.e., post $3^{rd}$ generation) mobile communication system are carried out in the international telecommunication union radio communication sector (ITU-R). The IMT-advanced aims at support of an Internet protocol (IP)-based multimedia service with a data transfer rate of 1 Gbps in a stationary or slowly moving state or 100 Mbps in a fast moving state.

3rd generation partnership project (3GPP) is a system standard satisfying requirements of the IMT-advanced, and prepares LTE-advanced which is an improved version of long term evolution (LTE) based on orthogonal frequency division multiple access (OFDMA)/single carrier-frequency division multiple access (SC-FDMA) transmission. The LTE-advanced is one of promising candidates for the IMT-advanced. A technology related to a relay station is one of main technologies for the LTE-advanced.

A relay station (RS) is a device for relaying a signal between a base station (BS) and a user equipment (UE), and is used for cell coverage extension and throughput enhancement of a wireless communication system.

Many researches for a method of transmitting a signal between the BS and the RS are currently ongoing in the wireless communication employing the RS. A conventional method of transmitting a signal between the BS and the UE has a problem when a signal is transmitted between the BS and the RS.

In the conventional method of transmitting the signal between the BS and the UE, the UE transmits the signal through one entire subframe in a time domain. One reason of transmitting a signal by the UE through the entire subframe is to set a duration of each channel for transmitting a signal to the maximum extent possible in order to reduce instantaneous maximum power consumed by the UE.

However, there is a case where the RS cannot transmit or receive a signal through one entire subframe in the time domain. In general, the RS relays a signal with respect to a plurality of UEs, which results in frequent occurrence of switching between a reception (Rx) mode and a transmission (Tx) mode. Further, the RS can receive a signal from the BS or can transmit a signal to a relay UE at the same frequency band. Alternatively, the RS can receive a signal from the relay UE or can transmit a signal to the BS at the same frequency band. The switching between the Rx mode and the Tx mode requires a specific time (hereinafter referred to as a guard time) between an Rx-mode period and a Tx-mode period. During the guard time, the RS does not transmit or receive a signal in order to avoid inter-signal interference and to provide reliable operations. The guard time may be shorter than one symbol time.

As described above, a subframe in which the RS transmits or receives a signal may include a guard time. In this case, symbols included in a frequency band in which the RS transmits or receives a signal may have boundaries which are mismatched to that of a symbol of a frequency band in which a macro UE transmits or receives a signal. Orthogonality is not maintained when the symbol boundaries are mismatched, which may result in occurrence of interference.

In a wireless communication system employing an RS, a signal transmission and reception method and apparatus capable of decreasing interference is required when symbol boundaries are mismatched between a symbol of a frequency band allocated to the RS and a symbol of a frequency band allocated to a macro UE.

SUMMARY OF INVENTION

Technical Problem

The present invention provides a method and apparatus for transmitting and receiving a signal, capable of decreasing interference with respect to a signal of a macro user equipment in a wireless communication system employing a relay station.

Technical Solution

According to one aspect of the present invention, a method of receiving a signal of a relay station in a wireless communication system is provided. The method includes: receiving backhaul resource allocation information from a base station; and receiving backhaul downlink data from the base station by using a radio resource indicated by the backhaul resource allocation information, wherein the radio resource includes a plurality of symbols in a time domain, and the plurality of symbols have boundaries which are shifted based on symbols included in a frequency band allocated to a macro user equipment, and wherein the radio resource includes a plurality of subcarriers in a frequency domain, and at least one subcarrier adjacent to the frequency band allocated to the macro user equipment among the plurality of subcarriers is set to a guard subcarrier in which the base station transmits no signal.

Advantageous Effects

According to the present invention, interference with a signal of a macro user equipment can be decreased by allocating a guard subcarrier in a radio resource region allocated to a relay station in a wireless communication system employing the relay station. Although the present invention is applicable to a backhaul link between the relay station and a base station, the present invention applies generally to a situation where symbol boundaries are mismatched between frequency bands, thereby being able to decrease interference that can occur between signals of the respective frequency bands.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the 3GPP LTE. For clarity, the following description will focus on the 3GPP LTE/LTE-A. However, technical features of the present invention are not limited thereto.

Figure 1:
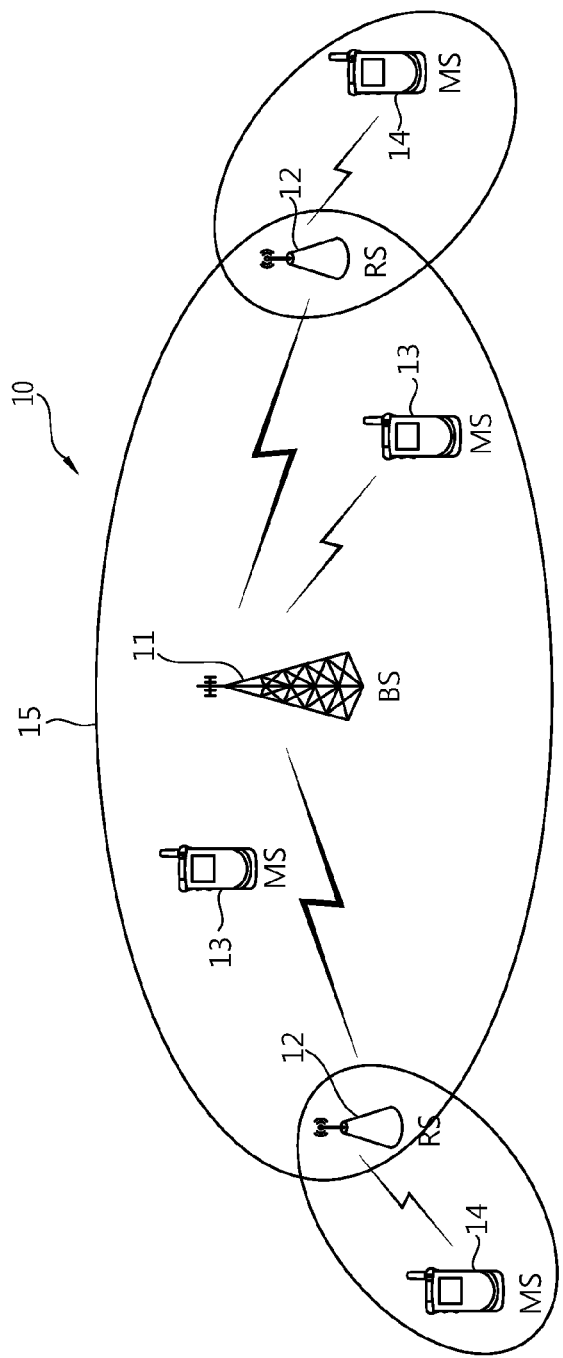
FIG. 1 shows a wireless communication system employing a relay station.

FIG. 1 shows a wireless communication system employing a relay station (RS).

Referring to FIG. 1, a wireless communication system 10 employing an RS includes at least one base station (BS) 11. Each BS 11 provides a communication service to a specific geographical region 15 generally referred to as a cell. The cell can be divided into a plurality of regions, and each region can be referred to as a sector. One or more cells may exist in the coverage of one BS. The BS 11 is generally a fixed station that communicates with a user equipment (UE) 13 and may be referred to as another terminology, such as an evolved node-B (eNB), a base transceiver system (BTS), an access point, an access network (AN), etc. The BS 11 can perform functions such as connectivity between an RS 12 and a UE 14, management, control, resource allocation, etc.

The RS 12 is a device for relaying a signal between the BS 11 and the UE 14, and is also referred to as another terminology such as a relay node (RN), a repeater, a relay, etc. A relay scheme used in the RS may be either amplify and forward (AF) or decode and forward (DF), and the technical features of the present invention are not limited thereto.

The UEs 13 and 14 may be fixed or mobile, and may be referred to as another terminology, such as a mobile station (MS), a user terminal (UT), a subscriber station (SS), a wireless device, a personal digital assistant (PDA), a wireless modem, a handheld device, an access terminal (AT), etc. Hereinafter, a macro UE (or Ma-UE) 13 denotes a UE that directly communicates with the BS 11, and a relay UE (or Rs-UE) 14 denotes a UE that communicates with the RS. Even if the Ma-UE 13 exists in a cell of the BS 11, the Ma-UE 13 can communicate with the BS 11 via the RS 12 to improve a data transfer rate depending on a diversity effect.

Hereinafter, a link between the BS 11 and the Ma-UE 13 is referred to as a macro link. The macro link can be divided into a macro downlink (M-DL) and a macro uplink (M-UL). The M-DL denotes communication from the BS 11 to the Ma-UE 13. The M-UL denotes communication from the Ma-UE 13 to the BS 11.

A link between the BS 11 and the RS 12 is referred to as a backhaul link. The backhaul link can be divided into a backhaul downlink (B-DL) and a backhaul uplink (B-UL). The B-DL denotes communication from the BS 11 to the RS 12. The B-UL denotes communication from the RS 12 to the BS 11.

A link between the RS 12 to the Rs-UE 14 is referred to as an access link. The access link can be divided into an access downlink (A-DL) and an access uplink (A-UL). The A-DL denotes communication from the RS 12 to the Rs-UE 14. The A-UL denotes communication from the Rs-UE 14 to the RS 12.

The wireless communication system 10 employing the RS is a system supporting bidirectional communication. The bidirectional communication may be performed by using a time division duplex (TDD) mode, a frequency division duplex (FDD) mode, etc. When in the TDD mode, different time resources are used in UL transmission and DL transmission. When in the FDD mode, different frequency resources are used in UL transmission and DL transmission.

Figure 2:
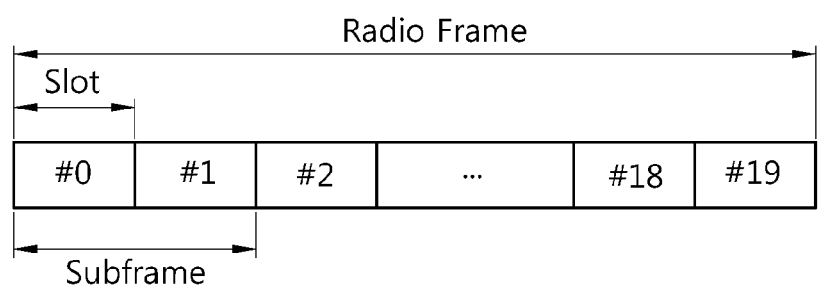
FIG. 2 shows a radio frame structure of $3^{rd}$ generation partnership project (3GPP) long term evolution (LTE).

FIG. 2 shows a radio frame structure of 3GPP LTE.

Referring to FIG. 2, a radio frame consists of 10 subframes. One subframe consists of 2 slots. One subframe may have a length of 1 millisecond (ms), and one slot may have a length of 0.5 ms. A time for transmitting one subframe is defined as a transmission time interval (TTI). The TTI may be a minimum unit of scheduling.

One slot may include a plurality of orthogonal frequency division multiplexing (OFDM) symbols in a time domain. Since the 3GPP LTE uses OFDMA in DL transmission, the OFDM symbol is for representing one symbol period, and can be referred to as other terms. For example, the OFDM symbol can also be referred to as an SC-FDMA symbol when SC-FDMA is used as a UL multiple-access scheme. Although it is described herein that one slot includes 7 OFDM symbols, the number of OFDM symbols included in one slot may change depending on a cyclic prefix (CP) length. According to 3GPP TS 36.211 V8.5.0(2008-12), in case of a normal CP, one subframe includes 7 OFDM symbols, and in case of an extended CP, one subframe includes 6 OFDM symbols. The radio frame structure is for exemplary purposes only, and thus the number of subframes included in the radio frame and the number of slots included in the subframe may change variously.

The sections 4.1 and 4.2 of 3GPP TS 36.211 V8.3.0 (2008-05) "Technical Specification Group Radio Access Network; Evolved Universal Terrestrial Radio Access (E-UTRA); Physical Channels and Modulation (Release 8)" can be incorporated herein by reference to explain the radio frame structure described with reference to FIG. 2.

Figure 3:
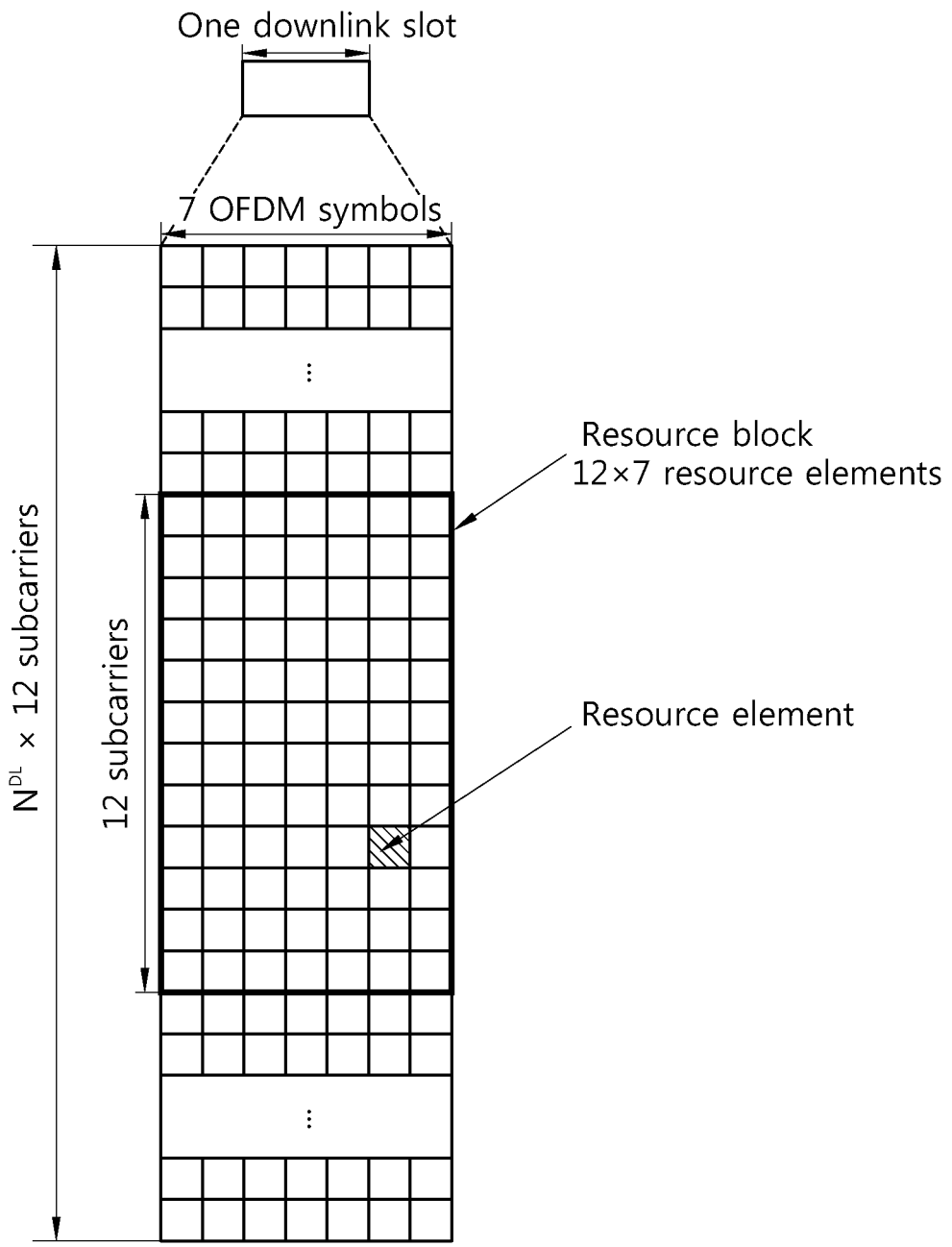
FIG. 3 shows an example of a resource grid for one downlink slot.

FIG. 3 shows an example of a resource grid for one DL slot.

In FDD and TDD radio frames, one slot includes a plurality of OFDM symbols in a time domain and a plurality of resource blocks (RBs) in a frequency domain. Hereinafter, a symbol may imply one OFDM symbol or one SC-FDMA symbol. The RB is a resource allocation unit, and includes a plurality of consecutive subcarriers in one slot.

Referring to FIG. 3, a slot (e.g., a DL slot included in a DL subframe) includes a plurality of OFDM symbols in the time domain. Although it is described herein that one DL slot includes 7 OFDM symbols and one RB includes 12 subcarriers in the frequency domain, this is for exemplary purposes only, and thus the present invention is not limited thereto. A subcarrier spacing may be, for example, 15 kHz in the RB.

Each element on the resource grid is referred to as a resource element, and one RB includes 12×7 resource elements. The number $N^{DL}$ of RBs included in the DL slot depends on a DL transmission bandwidth determined in a cell. The resource grid described in FIG. 3 can also apply to UL transmission.

Figure 4:
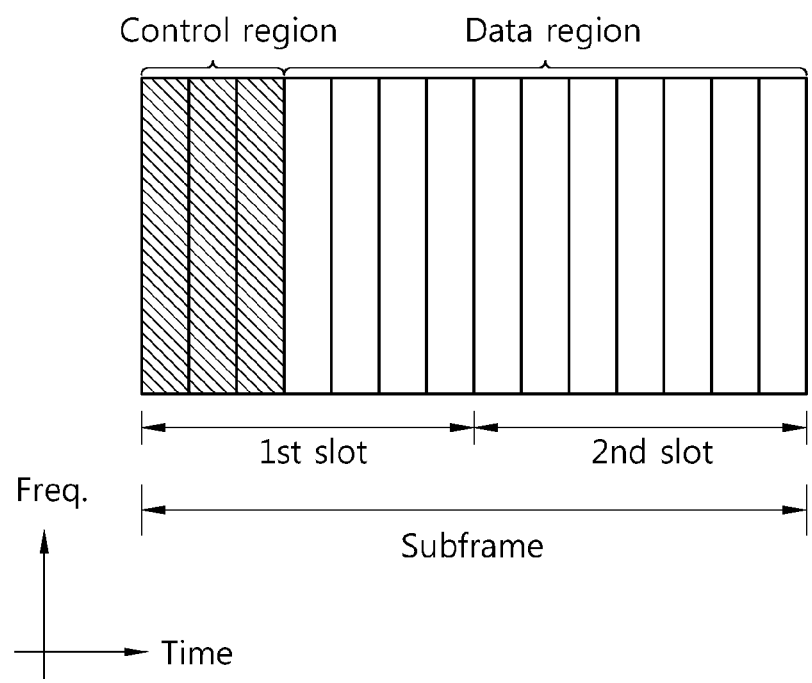
FIG. 4 shows a structure of a downlink subframe.

FIG. 4 shows a structure of a DL subframe.

Referring to FIG. 4, the subframe includes two consecutive slots. A maximum of three OFDM symbols located in a front portion of a $1^{st}$ slot within the subframe correspond to a control region to which a physical downlink control channel (PDCCH) is allocated. The remaining OFDM symbols correspond to a data region to which a physical downlink shared channel (PDSCH) is allocated. In addition to the PDCCH, control channels such as a physical control format indicator channel (PCFICH), a physical hybrid automatic repeat request (HARQ) indicator channel (PHICH), etc., can be allocated to the control region. A UE can read data information transmitted through the PDSCH by decoding control information transmitted through the PDCCH. Although the control region includes three OFDM symbols herein, this is for exemplary purposes only. Thus, two OFDM symbols or one OFDM symbol may be included in the control region. The number of OFDM symbols included in the control region of the subframe can be known by using the PCFICH.

The control region consists of a plurality of control channel elements (CCEs) as a logical CCE stream. Hereinafter, the CCE stream denotes a set of all CCEs constituting the control region in one subframe. The CCE corresponds to a plurality of resource element groups. For example, the CCE may correspond to 9 resource element groups. The resource element group is used to define mapping of a control channel onto a resource element. For example, one resource element group may consist of four resource elements.

A plurality of PDCCHs may be transmitted in the control region. The PDCCH carries control information such as scheduling allocation. The PDCCH is transmitted on an aggregation of one or several consecutive CCEs. A PDCCH format and the number of available PDCCH bits are determined according to the number of CCEs constituting the CCE aggregation. The number of CCEs used for PDCCH transmission is referred to as a CCE aggregation level. In addition, the CCE aggregation level is a CCE unit for searching for the PDCCH. A size of the CCE aggregation level is defined by the number of contiguous CCEs. For example, the CCE aggregation level may be an element of $\{1, 2, 4, 8\}$.

Control information transmitted through the PDCCH is referred to as downlink control information (hereinafter, DCI). The DCI includes uplink scheduling information, downlink scheduling information, system information, an uplink power control command, control information for paging, control information for indicating a random access channel (RACH) response, etc.

Examples of a DCI format include a format 0 for scheduling of a physical uplink shared channel (PUSCH), a format 1 for scheduling of one physical downlink shared channel (PDSCH) codeword, a format 1A for compact scheduling of the one PDSCH codeword, a format 1B for simple scheduling for rank-1 transmission of a single codeword in a spatial multiplexing mode, a format 1C for significantly compact scheduling of a downlink shared channel (DL-SCH), a format 1D for scheduling of the PDSCH in a multi-user spatial multiplexing mode, a format 2 for scheduling of the PDSCH in a closed-loop spatial multiplexing mode, a format 2A for scheduling of the PDSCH in an open-loop spatial multiplexing mode, a format 3 for transmission of a transmission power control (TPC) command for 2-bit power control for the PUCCH and the PUSCH, and a format 3A for transmission of a TPC command for 1-bit power control for the PUCCH and the PUSCH.

Figure 5:
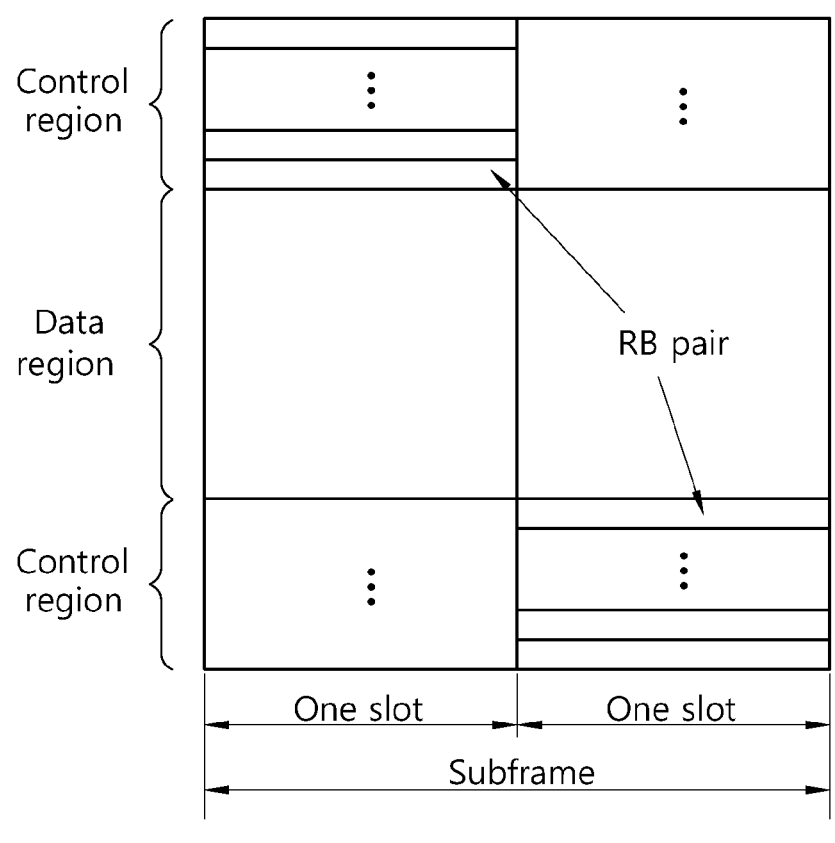
FIG. 5 shows an uplink subframe structure.

FIG. 5 shows a UL subframe structure.

Referring to FIG. 5, a UL subframe can be divided into a control region and a data region. The control region is a region to which a physical uplink control channel (PUCCH) for carrying UL control information is allocated. The data region is a region to which a physical uplink shared channel (PUSCH) for carrying user data is allocated.

The PUCCH for one UE is allocated in a pair of RBs 51 and 52. The RBs 51 and 52 belonging to the RB pair occupy different subcarriers in each of two slots. This is called that the RB pair allocated to the PUCCH is frequency-hopped in a slot boundary.

The PUCCH can support multiple formats. That is, UL control information having a different number of bits for each subframe can be transmitted according to a modulation scheme. For example, when using a binary phase shift keying (BPSK) (i.e., a PUCCH format 1a), 1-bit UL control information can be transmitted over the PUCCH, and when using quadrature phase shift keying (QPSK) (i.e., a PUCCH format 1b), 2-bit UL control information can be transmitted over the PUCCH. In addition thereto, examples of the PUCCH format include a format 1, a format 2, a format 2a, a format 2b, etc. For this, the section 5.4 of 3GPP TS 36.211 V8.2.0 (2008-03) "Technical Specification Group Radio Access Network; Evolved Universal Terrestrial Radio Access (E-UTRA); Physical Channels and Modulation (Release 8)" can be incorporated herein by reference.

Figure 6:
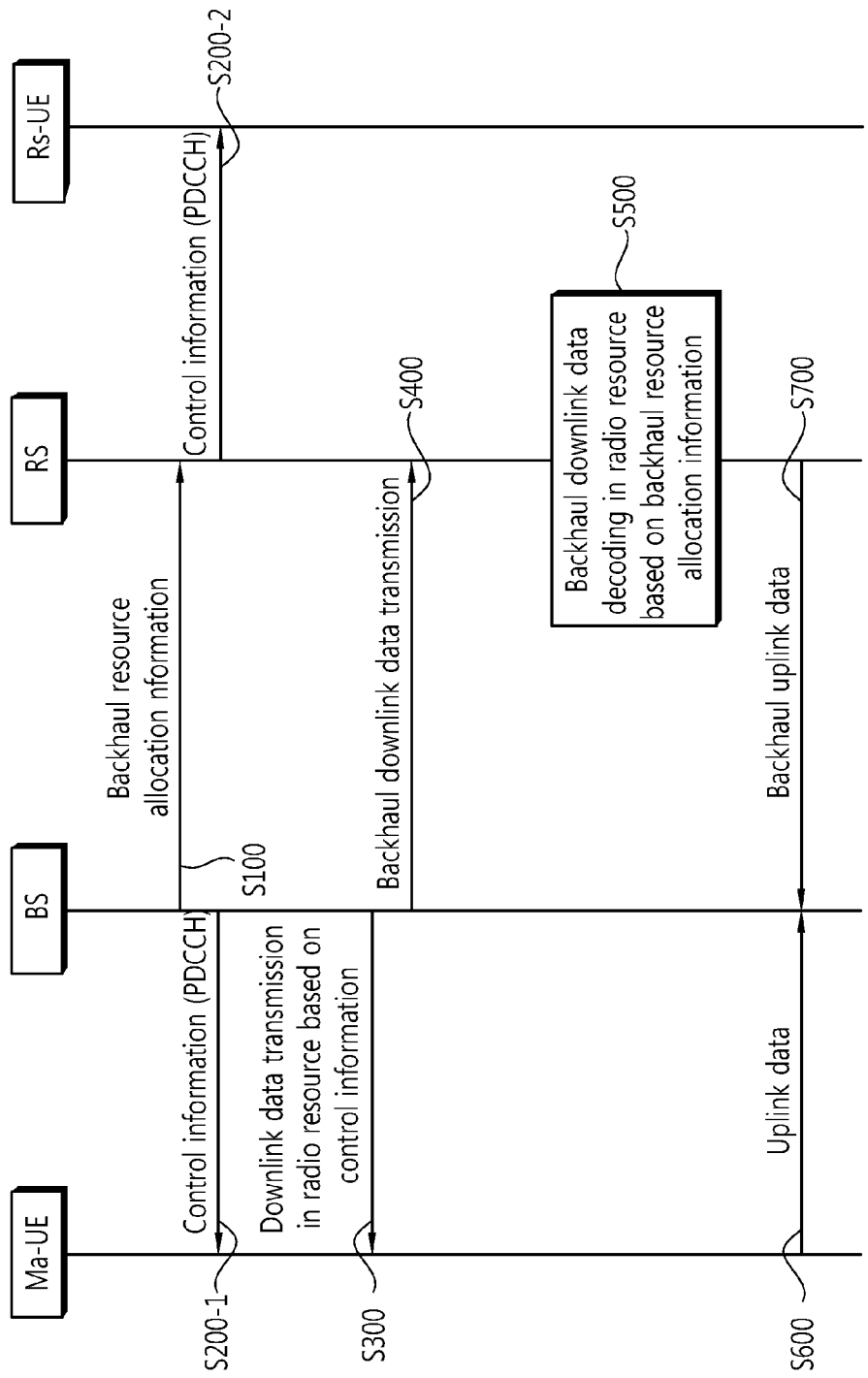
FIG. 6 shows a signal transmission method in a wireless communication system according to an embodiment of the present invention.

FIG. 6 shows a signal transmission method in a wireless communication system according to an embodiment of the present invention.

A BS transmits backhaul resource allocation information to an RS (step S100). The backhaul resource allocation information includes information on a radio resource region in which the BS transmits B-DL data to the RS and a radio resource region in which the RS transmits a control signal and/or B-UL data to the BS. For example, the backhaul resource allocation information may include information on the number of symbols of a PDCCH transmitted by the BS to a Ma-UE. In addition, the backhaul resource allocation information may include information on a guard time and a guard subcarrier included in a subframe. The guard time and the guard subcarrier will be described below. The backhaul resource allocation information may be transmitted through a higher layer signal (e.g., radio resource control (RRC)) or a physical layer signal.

By receiving the backhaul resource allocation information from the BS, the RS can know the radio resource region in which the B-DL data is received and the radio resource region in which the control signal and/or the B-UL data are transmitted to the BS. Hereinafter, the radio resource region will be described in detail with reference to a B-DL subframe structure and a B-UL subframe structure.

The BS transmits control information to the Ma-UE in a specific number of symbols of the subframe (step S200-1). In this case, the RS transmits control information to a Rs-UE in a specific number of symbols in a subframe (step S200-2).

The BS transmits DL data to the Ma-UE in a radio resource region based on the control information (step S300), and transmits B-DL data to the RS in a radio resource region based on the backhaul resource allocation information (step S400).

The RS performs decoding by receiving the B-DL data in the radio resource region based on the backhaul resource allocation information (step S500).

The Ma-UE transmits UL data to the BS (step S600). The RS transmits B-UL data in the radio resource region allocated based on the backhaul resource allocation information to the BS (step S700). In this case, the Ma-UE and the RS can transmit their signals to the BS by using different radio resources in the same subframe.

Figure 7:
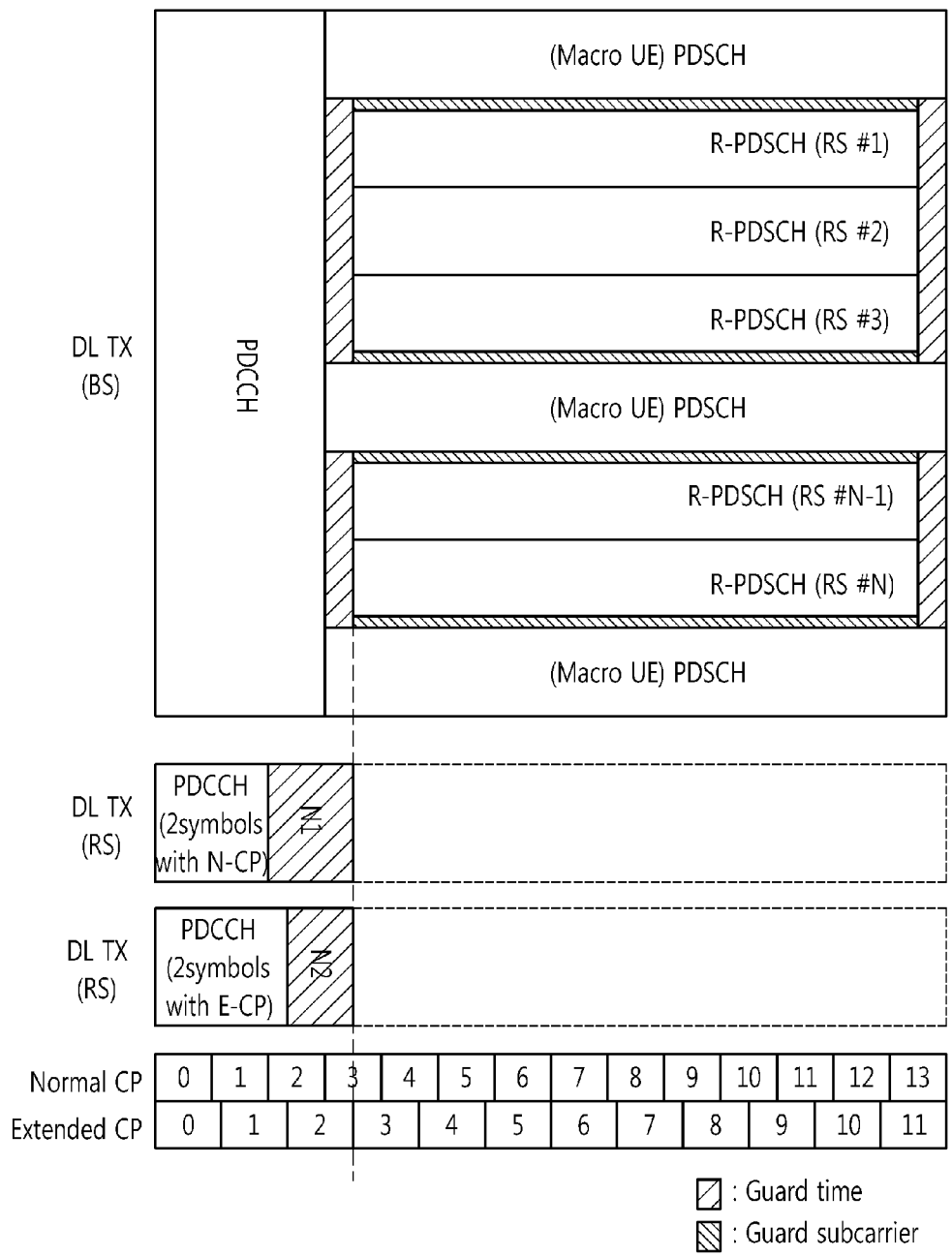
FIG. 7 shows an example of a backhaul downlink subframe structure.

FIG. 7 shows an example of a B-DL subframe structure.

A BS can transmit control information (through a PDCCH) to a Ma-UE by using a specific number of symbols (e.g., 3 symbols in a normal CP and 2 symbols in an extended CP), and can transmit data to an RS in subsequent symbols. In this case, as shown in FIG. 7, data can be transmitted to the RS in a radio resource region allocated to the RS (i.e., a region indicated by R-PDSCH (RS# n, n=1, 2, 3, . . . , N−1, N), hereinafter, the same is true), and data can be transmitted to the Ma-UE in a radio resource region allocated to the Ma-UE (i.e., a region indicated by (Macro UE) PDSCH, hereinafter, the same is true).

The RS can transmit control information (through a PDCCH) to a Rs-UE by using a specific number of symbols, for example, up to two symbols, and can receive data from the BS in a radio resource region allocated to the RS. In this case, the radio resource region allocated to the RS may include a guard time in a time domain and a guard subcarrier in a frequency domain.

When a wireless communication system employs the RS, it is assumed that it is difficult for the RS to simultaneously receive and transmit signals in the same frequency band. Therefore, the RS receives or transmits signals of the same frequency band at different times. For example, the RS may receive a signal from the BS in a subframe #n and transmit a signal to the Rs-UE in a subframe #n+1.

However, in case of switching transmission/reception of a signal, such as in a case where the RS receives a signal while transmitting a signal of the same frequency band or the RS transmits a signal while receiving a signal of the same frequency band, a guard time is required between a transmission period and a reception period of the signal. The guard time is a time required to generate a signal that satisfies system reliability, protection, or requirements required by a system. For example, the guard time may include a transient time for operation reliability of a power amplifier that amplifies a signal. As shown in FIG. 7, the guard time is included in a time domain of a radio resource allocated to the RS. The guard time may be a time period less than one symbol, for example, may be a ½ symbol period.

Due to the aforementioned guard time, the radio resource region allocated to the RS may have a symbol boundary mismatched to that of a radio resource region allocated to the Ma-UE. When the symbol boundaries are mismatched to each other, orthogonality may not be maintained between signals respectively transmitted in the radio resource region allocated to the RS and the radio resource region allocated to the Ma-UE, which may result in occurrence of interference. To cancel the interference, the radio resource region allocated to the RS may include the guard carrier. The BS does not transmit a signal through the guard carrier in a B-DL. The RS does not transmit a signal through the guard carrier in a B-UL. That is, the BS transmits a signal only through a subcarrier other than the guard carrier in resource blocks allocated to the RS. Likewise, the RS transmits a signal only through a subcarrier other than the guard subcarrier in resource blocks allocated to the RS. The guard carrier can be set semi-statically.

Figure 8:
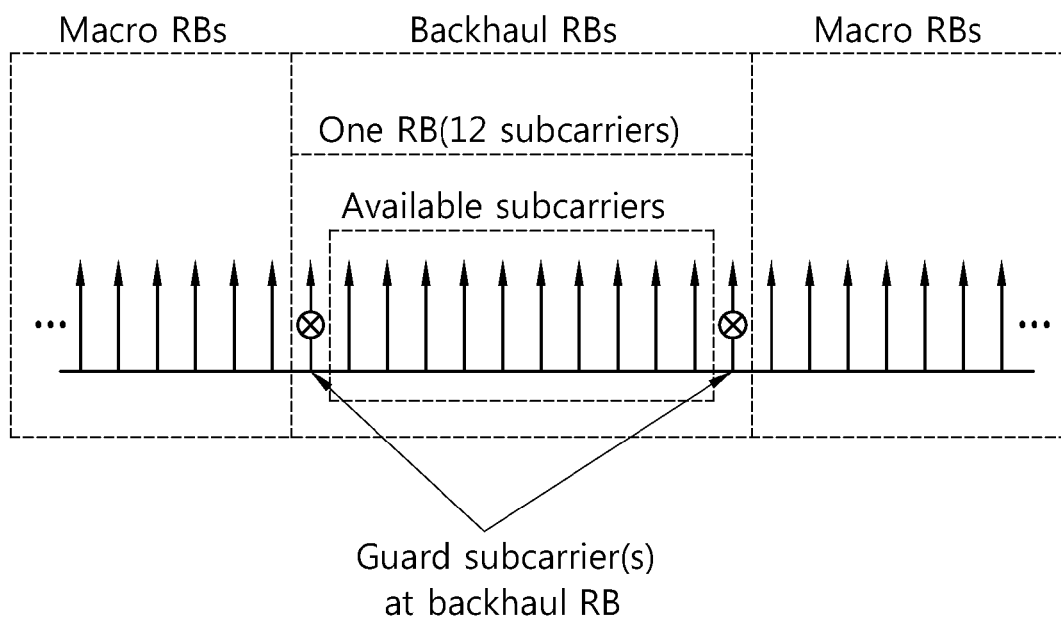
FIG. 8 shows an example of allocating a guard subcarrier in a resource block included in a radio resource region allocated to a relay station.

FIG. 8 shows an example of allocating a guard subcarrier in a resource block included in a radio resource region allocated to an RS.

If a resource block (RB) included in a radio resource region allocated to the RS is referred to as a backhaul RB and a resource block included in a radio resource region allocated to a Ma-UE is referred to as a macro RB, then a BS can allocate at least one subcarrier adjacent to the macro RB as a guard subcarrier in the backhaul RB. In the example of FIG. 8, two subcarriers adjacent to the macro RB are allocated as a guard subcarrier in one backhaul RB. In this case, the number of subcarriers that can be used in the backhaul RB may be not 12 but 10. If a plurality of backhaul RBs are included in the resource region allocated to the RS, only one subcarrier adjacent to the macro RB can be allocated as a guard subcarrier in each backhaul RB. In this case, the number of subcarriers that can be used in the backhaul RB adjacent to the macro RB may be 11.

In addition, although a case where one subcarrier located at a boundary of the backhaul RB is allocated as a guard subcarrier is exemplified in FIG. 8, the present invention is not limited thereto. For example, a plurality of subcarriers located at the boundary of the backhaul RB (adjacent to the macro RB) can be allocated as the guard subcarrier. Alternatively, if a plurality of backhaul RBs are included in the resource region allocated to the RS, at least one backhaul RB can be allocated as the guard subcarrier. That is, the entirety of the subcarrier included in the backhaul RB adjacent to the resource region allocated to the Ma-UE can be allocated as the guard subcarrier. That is, the guard subcarrier can be allocated on a subcarrier basis or on a resource block basis.

Figure 9:
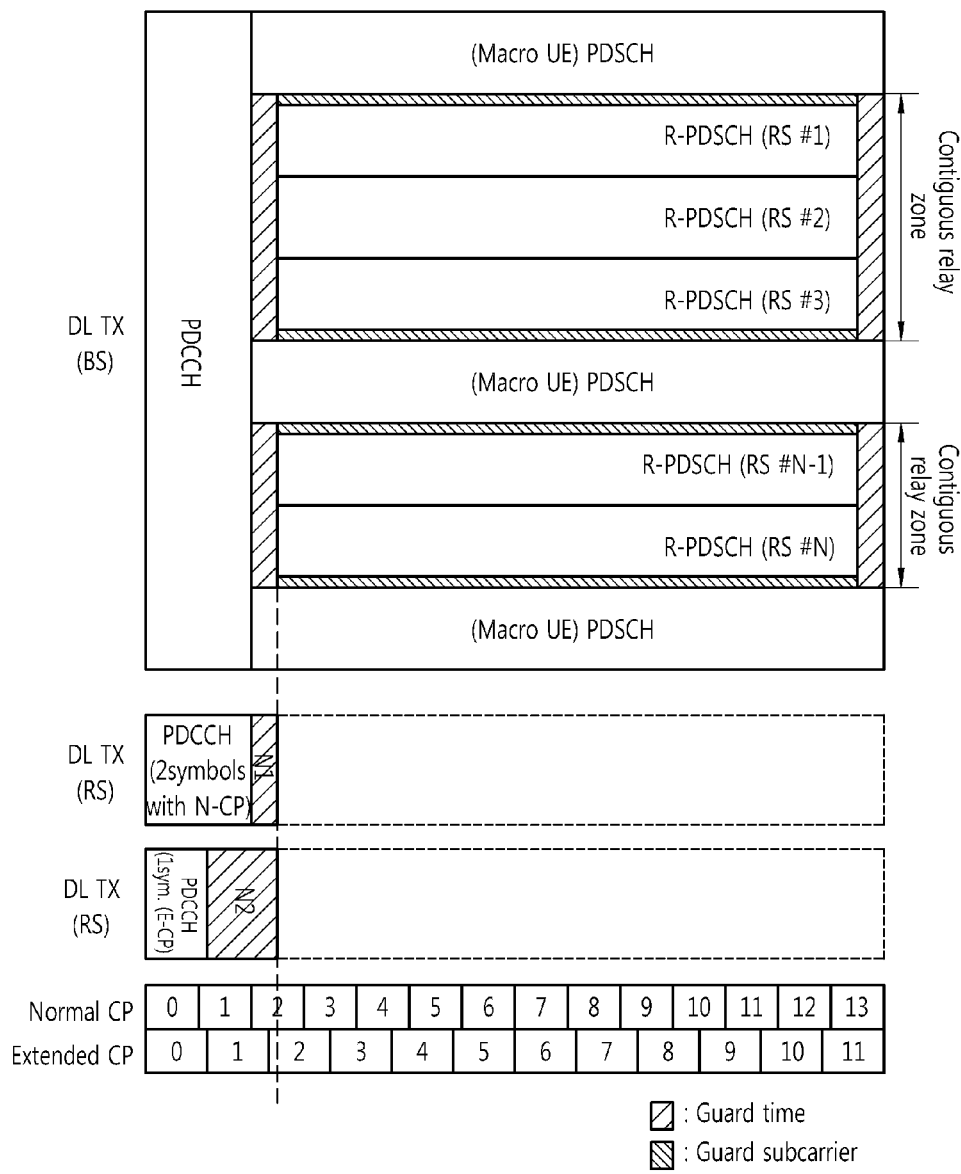
FIG. 9 to FIG. 11 show other examples of a backhaul downlink subframe including a guard time and a guard subcarrier.
Figure 10:
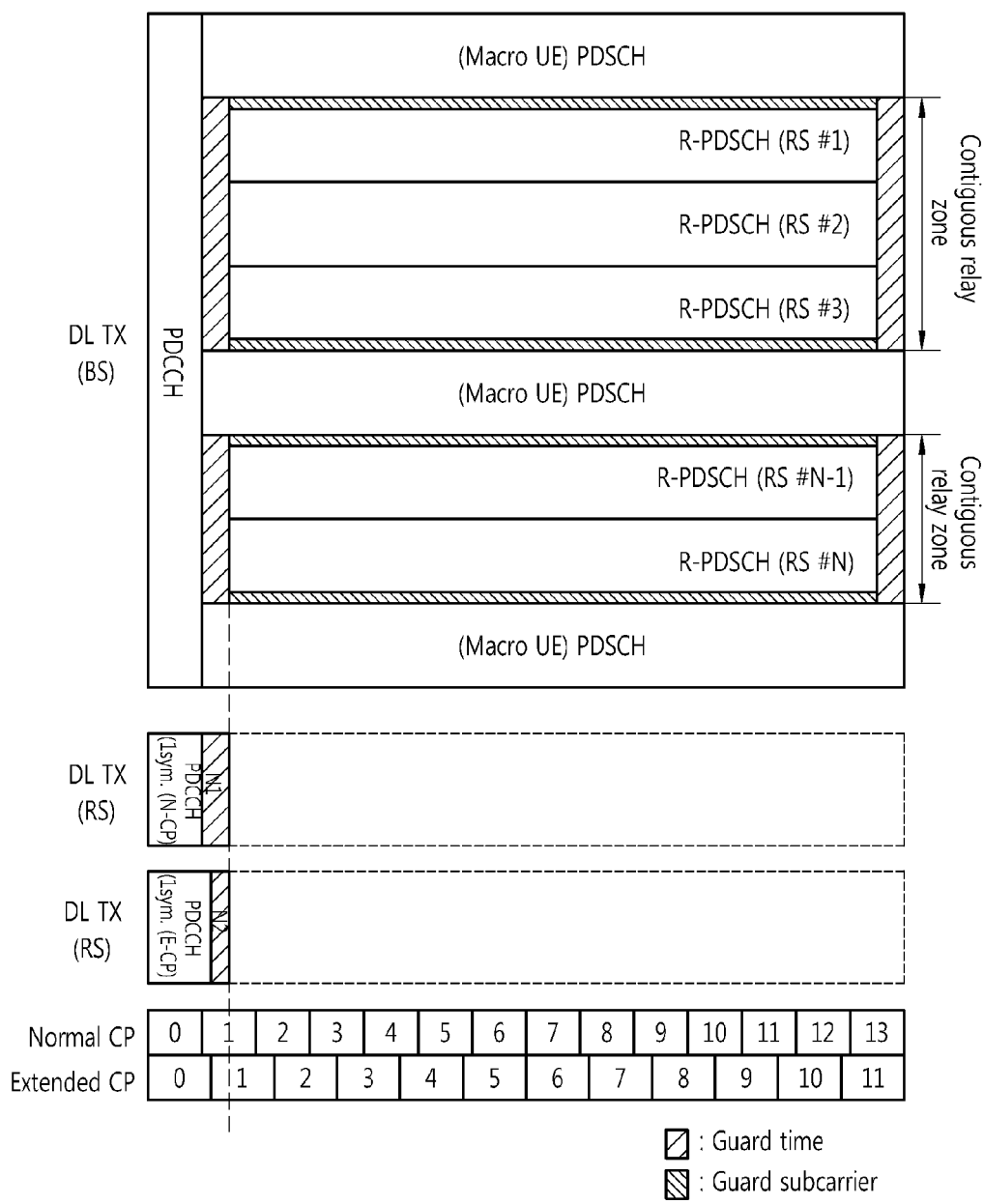
Figure 11:
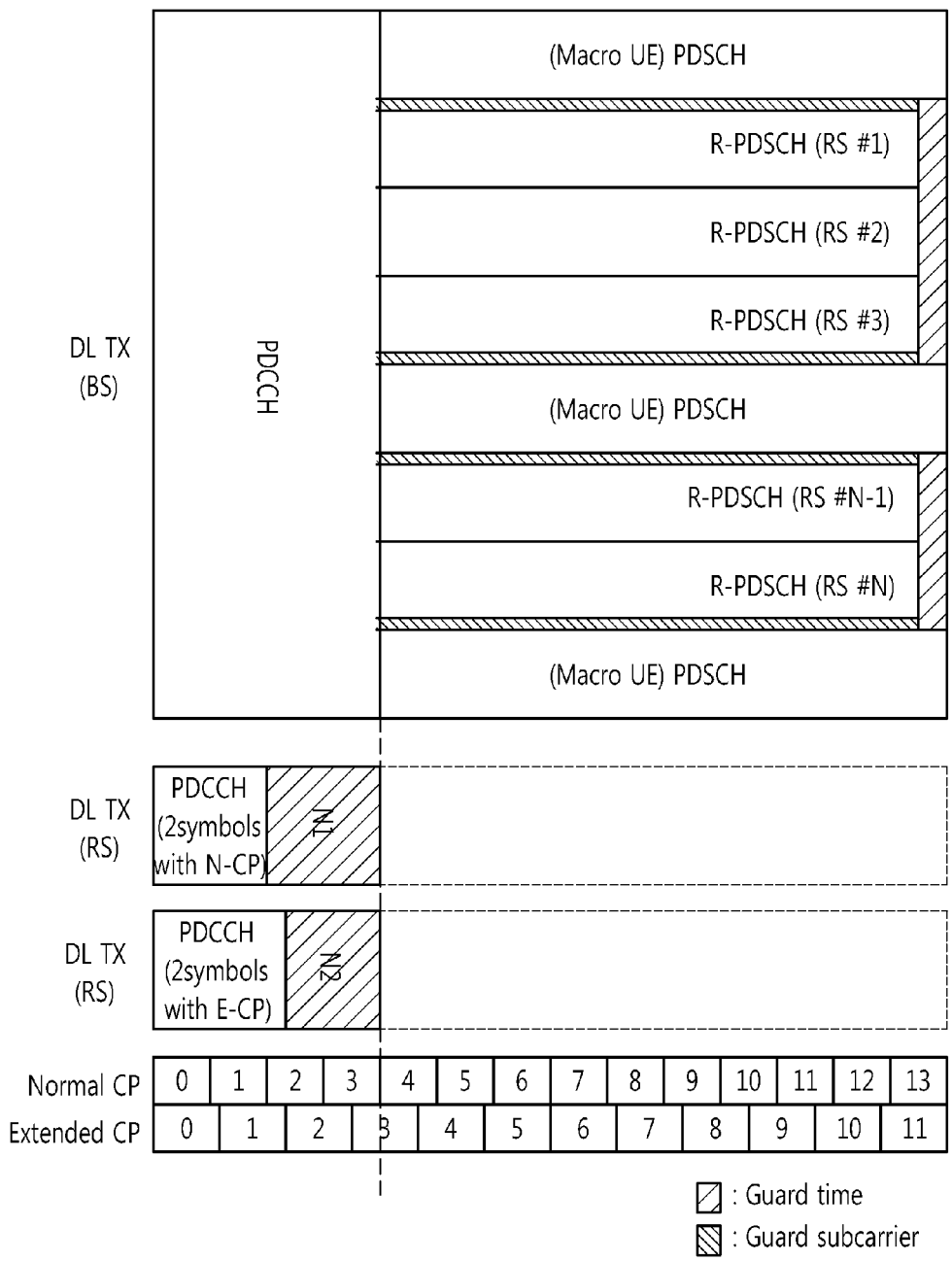

FIG. 9 to FIG. 11 show other examples of a B-DL subframe including a guard time and a guard subcarrier.

The number of symbols of a PDCCH transmitted by a BS to a Ma-UE is 2 in FIG. 9, 1 in FIG. 10, and 4 in FIG. 11.

In the example of FIG. 9, the number of symbols of a PDCCH transmitted by an RS to a Rs-UE is 2 in a normal CP and 1 in an extended CP. In case of the normal CP, the number of symbols of the PDCCH transmitted by the BS to the Ma-UE is 2 which is equal to the number of symbols of the PDCCH transmitted by the RS to the Rs-UE. Therefore, the RS transmits the PDCCH to the Rs-UE by using two symbols and provides a guard time and thereafter receives a signal from the BS. A last symbol of a B-DL subframe may also require a guard time. For example, when the RS transmits a signal to the Rs-UE in a next subframe, the guard time may be necessary due to occurrence of reception/transmission switching of the signal. In this case, the RS can receive B-DL data from the BS by using 11 symbols in the normal CP and by using 9 symbols in the extended CP.

In addition, among frequency bands allocated to the RS, a subcarrier located at a boundary of a frequency band adjacent to a frequency band allocated to the Ma-UE is allocated as a guard subcarrier. That is, as shown in FIG. 9, the guard subcarrier can be included in frequency bands R-PDSCH (RS#1), R-PDSCH(RS#3), R-PDSCH(RS#N−1), and R-PDSCH(RS#N) allocated to RSs #1, #3, #N−1, and #N.

In the example of FIG. 10, the number of symbols of a PDCCH transmitted by an RS to a Rs-UE is 1 in a normal CP and 1 in an extended CP. In this case, if a guard time is also required in a last symbol of a B-DL subframe, the number of symbols that can be used to receive B-DL data by the RS from a BS is 12 in case of the normal CP and 10 in case of the extended CP.

In the example of FIG. 11, the number of symbols of a PDCCH transmitted by an RS to a Rs-UE is 2 in a normal CP and 2 in an extended CP. That is, the number of symbols of the PDCCH transmitted by a BS to a Ma-UE is greater than the number of symbols of the PDCCH transmitted by the RS to the Rs-UE. In this case, a radio resource allocated to the RS may not include a guard time in a first symbol. For example, the RS can receive B-DL data from the BS starting from a $5^{th}$ symbol without the guard time in case of the normal CP. If the guard time is required in the last symbol of the B-DL subframe, the RS can receive the B-DL data by using 9 symbols in the normal CP and by using 8 symbols in the extended CP.

Hereinafter, a B-UL subframe structure in which an RS transmits a signal to a BS will be described.

Figure 12:
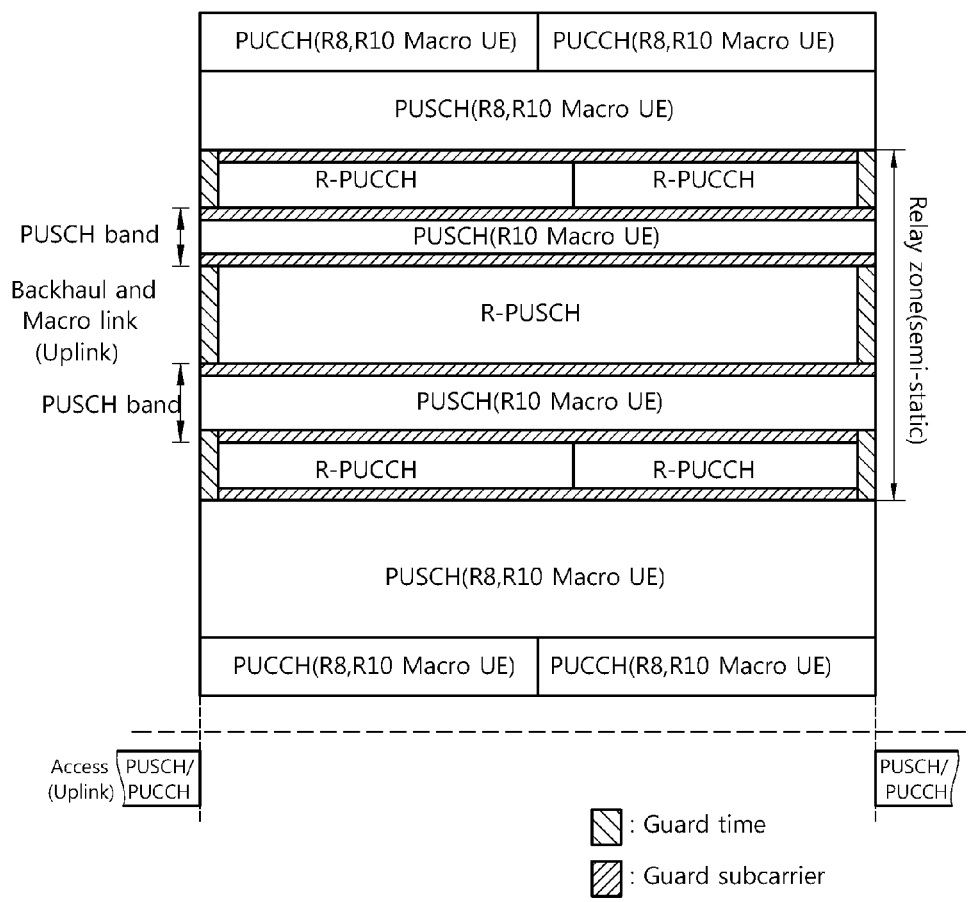
FIG. 12 shows an example of a backhaul uplink subframe structure.

FIG. 12 shows an example of a B-UL subframe structure.

A radio resource region allocated to an RS in a B-UL subframe is called a relay zone. An R-PUCCH on which the RS transmits a control signal and an R-PUSCH on which the RS transmits data can be allocated to the relay zone. The relay zone can be located between PUCCH bands in which a control signal of a Ma-UE is transmitted in a frequency domain. The B-UL subframe needs to maintain backward compatibility with the legacy wireless communication system, for example, LTE release-8(R8). Therefore, similarly to LTE R8, a PUCCH of the Ma-UE can be allocated to a boundary of the frequency band, and the relay zone can be located between PUCCH bands of the Ma-UE.

The relay zone can include a guard time in a time domain, and can include a guard subcarrier in a frequency domain. As the guard subcarrier, a subcarrier of a relay zone adjacent to a frequency band allocated to the Ma-UE, that is, a subcarrier located at a boundary of a frequency domain of the relay zone, can be allocated. In the B-DL subframe structure, the guard subcarrier can be configured on a subcarrier basis and a resource block basis as described above.

In the R-PUCCH and R-PUSCH bands, a symbol boundary is shifted due to the guard time. That is, it may be shifted by the guard time instead of being matched to the symbol boundary of the PUCCH and PUSCH bands allocated to the Ma-UE. In order to decrease interference that may occur due to the mismatch of the symbol boundary, the guard subcarrier is allocated in the frequency domain. In the example of FIG. 12, a guard time is included in first and last symbols of a relay zone. In addition, a subcarrier of a relay zone adjacent to a band allocated to the Ma-UE is allocated as the guard subcarrier.

In the relay zone, a PUSCH on which the Ma-UE transmits UL data can be allocated. For example, in case of a Ma-UE that operates based on LTE release 10(R10), the PUSCH can be allocated also in the relay zone. In this case, a subcarrier located at a boundary of a PUSCH band can be allocated as a guard subcarrier. That is, a subcarrier located at a boundary of a PUSCH band allocated to the Ma-UE in the relay zone can be set to the guard subcarrier.

Figure 13:
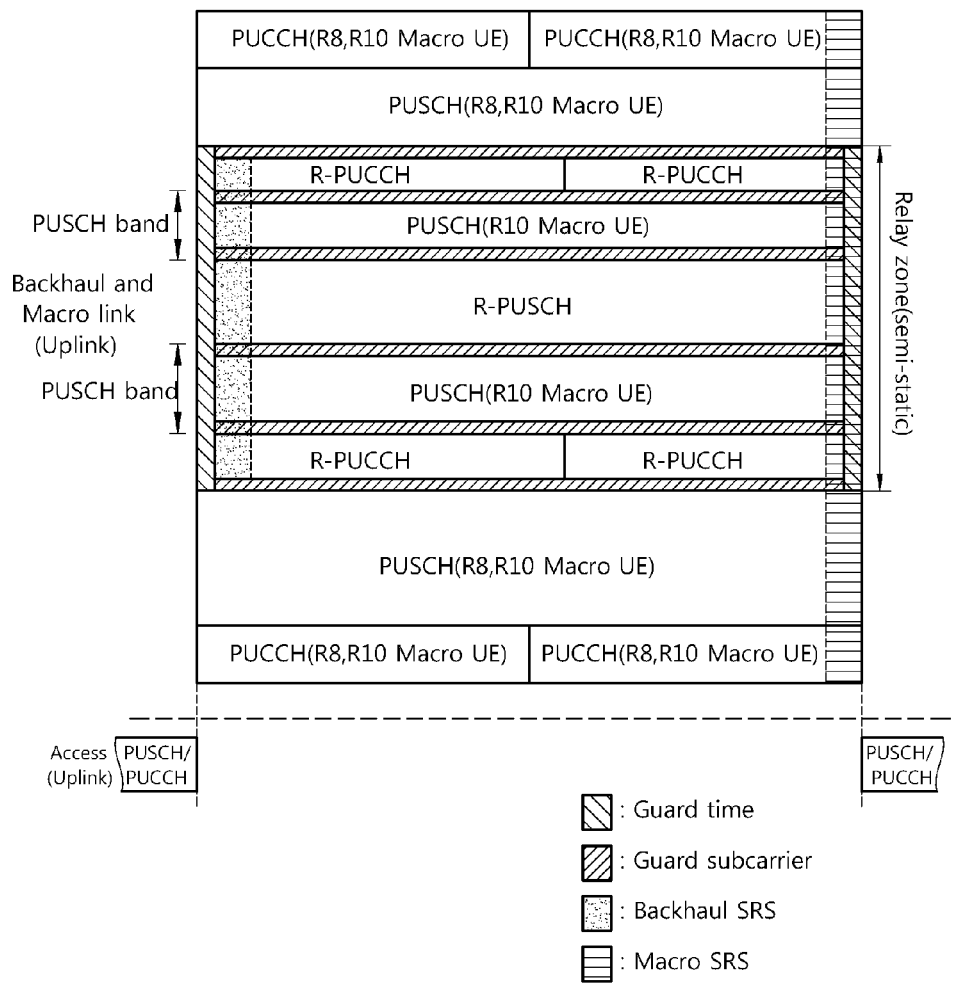
FIG. 13 shows another example of a backhaul uplink subframe structure.

FIG. 13 shows another example of a B-UL subframe structure.

FIG. 13 is different from FIG. 12 in a sense that a guard time is not included in a last symbol of a B-UL subframe. When the guard time is not included in the last symbol of the B-UL subframe, the guard time can be included in a first symbol of a subframe (i.e., an A-UL subframe in which a Rs-UE transmits a signal to an RS) subsequent to the B-UL subframe.

Alternatively, when the RS also transmits a signal to a BS in a next subframe, such a B-UL subframe structure can be used.

When the guard time is not included in the last symbol of the B-UL subframe, an amount of remaining radio resources is equal to the guard time. The radio resource can be used when the RS transmits a B-UL control signal or partial B-UL data. Alternatively, the radio resource can be used when the RS transmits a sounding reference signal (SRS) to the BS.

Hereinafter, a case where an RS transmits an SRS in a B-UL subframe will be described.

The SRS is a reference signal transmitted by a UE or the RS to a BS, and is a reference signal which is not related to UL data or control signal transmission. In general, the SRS may be used for channel quality estimation for frequency selective scheduling in uplink (i.e., M-UL or B-UL) or may be used for other usages. For example, the SRS may be used in power control, initial MCS selection, initial power control for data transmission, etc. Hereinafter, an SRS transmitted by a Ma-UE to a BS is called a macro SRS, and an SRS transmitted by an RS to a BS is called a backhaul SRS.

Figure 14:
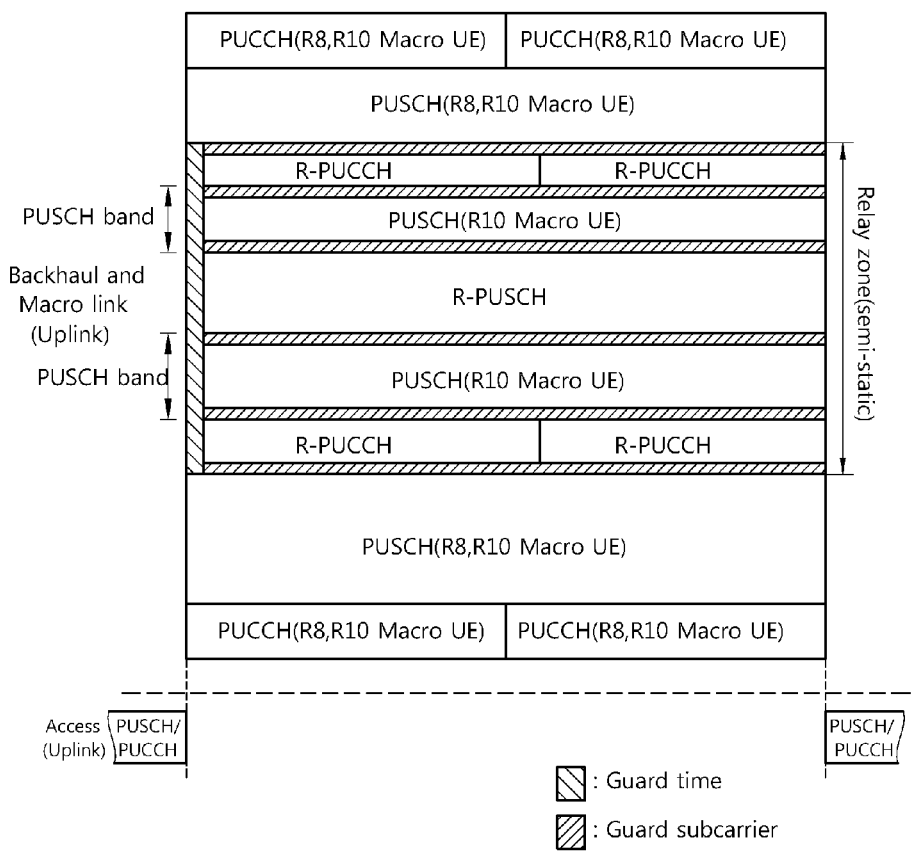
FIG. 14 and FIG. 15 show examples of a subframe structure when a backhaul sounding reference signal (SRS) is transmitted in a backhaul uplink subframe.
Figure 15:
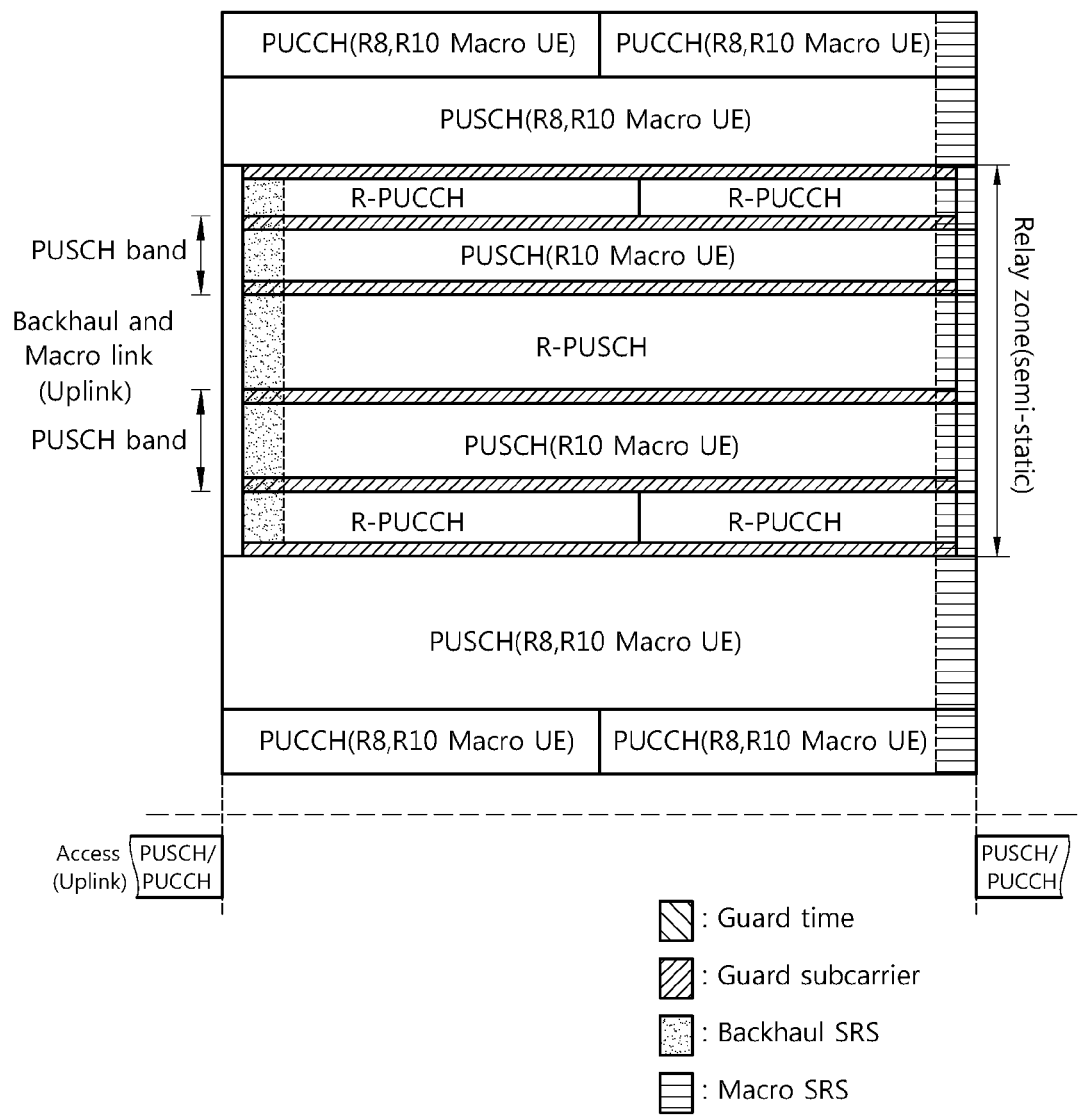

FIG. 14 and FIG. 15 show examples of a subframe structure when a backhaul SRS is transmitted in a B-UL subframe. FIG. 14 shows a case where a backhaul SRS is transmitted in the B-UL subframe structure of FIG. 12. FIG. 15 is different from FIG. 14 in a sense that a guard time is not included in a last symbol of a subframe. That is, FIG. 15 shows a case where a backhaul SRS is transmitted in the B-UL subframe structure of FIG. 13.

A Ma_UE can transmit a macro SRS by using a last symbol of a subframe. If an RS transmits a backhaul SRS by using the same symbol as the Ma_UE, that is, the last symbol of the subframe, a method for preventing collision is required. For example, the macro SRS and the backhaul SRS can be transmitted by allocating them to different subcarriers. The macro SRS can be allocated to an odd-numbered subcarrier, and the backhaul SRS can be allocated to an even-numbered subcarrier. For this, a BS can report backhaul SRS allocation information to the RS by using a higher layer signal (e.g., radio resource control (RRC)) or a physical layer signal.

The RS can transmit the backhaul SRS in a symbol other than a symbol in which the macro SRS is transmitted. For example, the RS can transmit the backhaul SRS in a second last symbol of the subframe or a first symbol of a relay zone. Herein, the first symbol of the relay zone may be a symbol which is shifted by a guard time in comparison with a radio resource region allocated to the Ma_UE.

Alternatively, the RS can transmit the backhaul SRS in an intermediate symbol of the subframe. For example, 14 symbols are included in a subframe in case of a normal CP, and among them, the RS can use only 13 symbols due to the guard time. In this case, a first slot may include 7 symbols, and a second slot may include 6 symbols. Then, the backhaul SRS can be transmitted in a last symbol of the first slot. According to this method, collision does not occur since the backhaul SRS and the macro SRS are not transmitted in different symbols. In addition, when it is not necessary to transmit the backhaul SRS, a corresponding symbol can be punctured so that two slots both use 6 symbols and thus there is an advantage in that a slot structure can be configured symmetrically.

Figure 16:
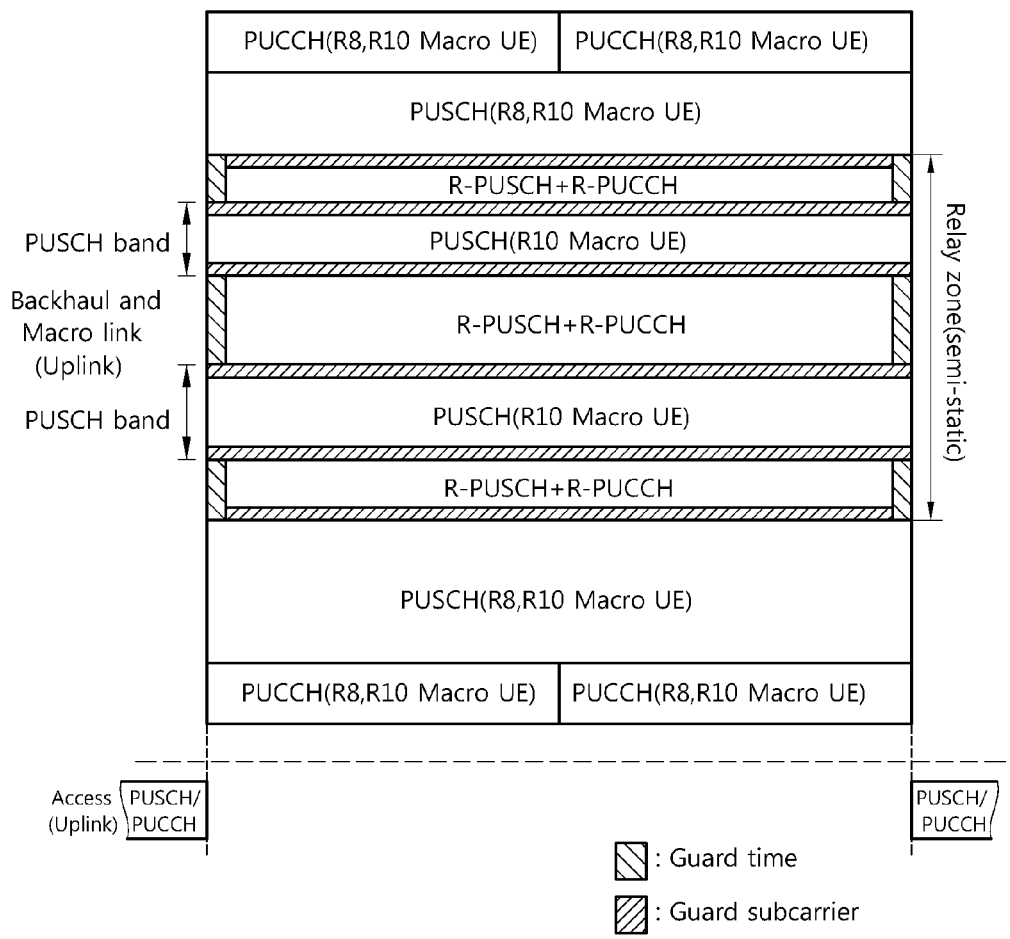
FIG. 16 and FIG. 17 show other examples of a backhaul uplink subframe structure.
Figure 17:
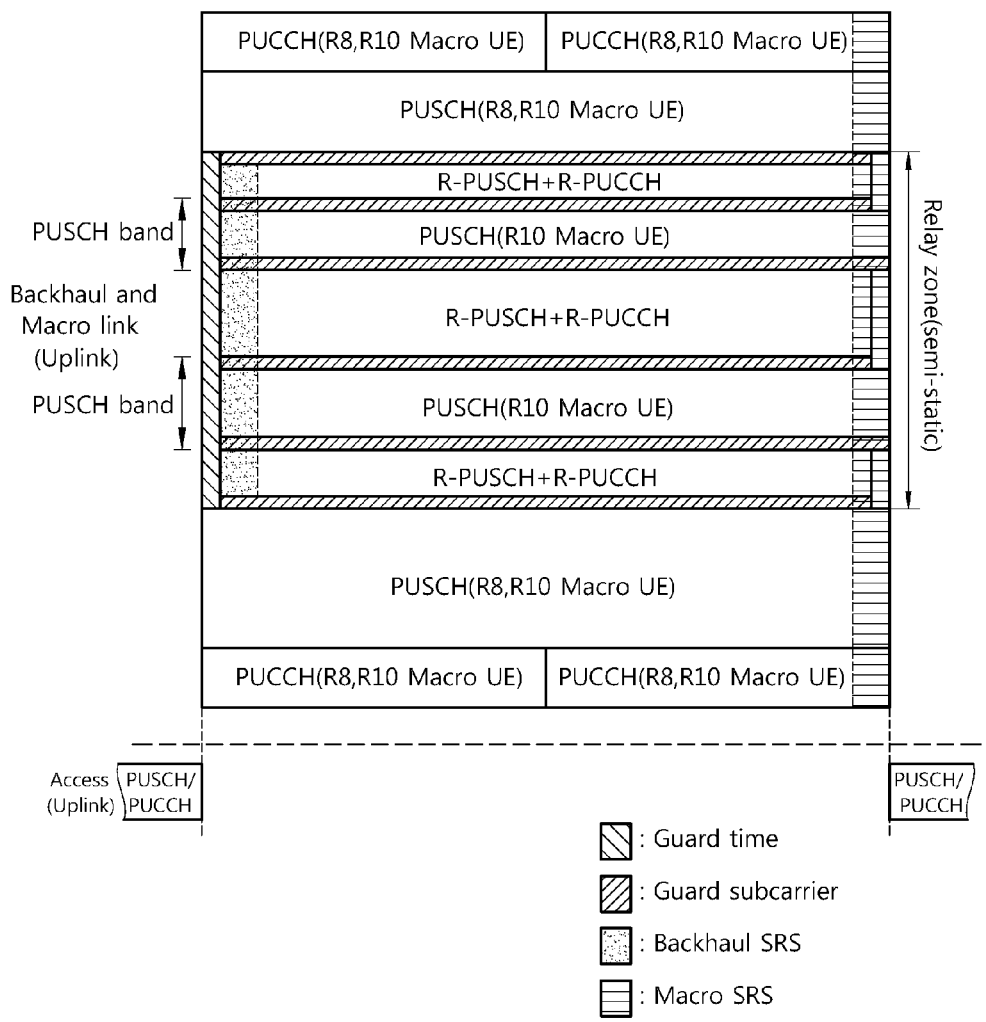

FIG. 16 and FIG. 17 show other examples of a B-UL subframe structure.

Referring to FIG. 16, in a relay zone, symbols have boundaries shifted by a guard time in comparison with a resource region allocated to a Ma-UE. Therefore, the number of symbols that can be used in the relay zone may be 13 in a normal CP and may be 11 in an extended CP.

An RS can transmit a control signal and data in the relay zone by allocating them to the same frequency band. That is, the control signal can be transmitted together in a band in which the data is transmitted, and in this case, a frequency band in which the control signal is transmitted does not have to be additionally allocated in the relay zone. FIG. 17 is different from FIG. 16 in a sense that a guard time is not included in a last symbol of a B-UL subframe.

As described above, by configuring a guard subcarrier of a frequency domain in the radio resource region allocated to the RS, it is possible to decrease interference which may occur when a signal is transmitted or received between the RS and the Ma-UE. Although the above examples are for a case of using a backhaul link, the present invention is not limited thereto. That is, the present invention also equally applies to a case where a symbol boundary of a radio resource used for a specific frequency band is mismatched to a symbol boundary of a radio resource used in another frequency band. In other words, among subcarriers included in the specific frequency band, at least one subcarrier adjacent to another frequency band can be set to a guard subcarrier, so as to decrease interference that may occur between frequency bands.

Figure 18:
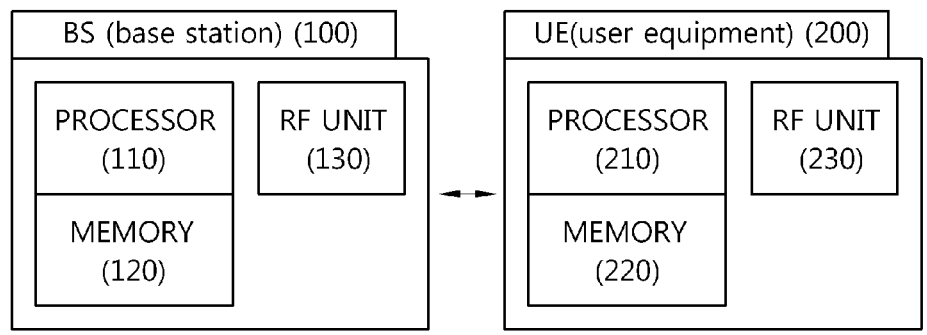
FIG. 18 is a block diagram showing a base station and a relay station.

FIG. 18 is a block diagram showing a BS and an RS.

A BS 100 includes a processor 110, a memory 120, and a radio frequency (RF) unit 130. The processor 110 implements the proposed functions, procedure, and/or methods. That is, backhaul resource allocation information is transmitted to the RS, and B-DL data is transmitted in a radio resource based on the backhaul resource allocation information. In addition, B-UL data and control signals are received through a radio resource indicated by the backhaul resource allocation information. The memory 120 coupled to the processor 110 stores a variety of information for driving the processor 110. The RF unit 130 coupled to the processor 110 transmits and/or receives a radio signal.

An RS 200 includes a processor 210, a memory 220, and an RF unit 230. The processor 210 receives backhaul resource allocation information from the BS, and receives B-DL data from the BS by using a radio resource indicated by the backhaul resource allocation information or transmits B-UL data and control signals. In this case, the radio resource includes a plurality of symbols in a time domain, and the plurality of symbols have boundaries which are shifted based on symbols included in a frequency band allocated to a Ma-UE. In addition, the radio resource for receiving B-DL data includes a plurality of subcarriers in a frequency domain, and at least one subcarrier adjacent to a frequency band allocated to the Ma-UE among the plurality of subcarriers is set to a guard subcarrier in which the BS transmits no signal. When transmitting B-UL data and control signals, the B-UL data or control signals may not be transmitted in at least one subcarrier adjacent to a frequency band allocated to the Ma-UE. Layers of a radio interface protocol can be implemented by the processor 210. The memory 220 coupled to the processor 210 stores a variety of information for driving the processor 210. The RF unit 230 coupled to the processor 210 transmits and/or receives a radio signal.

The processors 110 and 210 may include an application-specific integrated circuit (ASIC), a separate chipset, a logic circuit, and/or a data processing unit. The OFDM transmitter and the OFDM receiver of FIG. 7 can be implemented in the processors 110 and 210. The memories 120 and 220 may include a read-only memory (ROM), a random access memory (RAM), a flash memory, a memory card, a storage medium, and/or other equivalent storage devices. The RF units 130 and 230 may include a base-band circuit for transmitting and/or receiving a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of receiving a signal of a relay station in a wireless communication system, the method comprising:
   receiving backhaul resource allocation information from a base station; and
   receiving backhaul downlink data from the base station by using a radio resource indicated by the backhaul resource allocation information,
   wherein the radio resource includes a plurality of symbols in a time domain, and the plurality of symbols have boundaries which are shifted based on symbols included in a frequency band allocated to a macro user equipment, and
   wherein the radio resource includes a plurality of subcarriers in a frequency domain, and at least one subcarrier adjacent to the frequency band allocated to the macro user equipment among the plurality of subcarriers is set to a guard subcarrier in which the base station transmits no signal.

2. The method of claim 1, further comprising transmitting a control signal by the relay station to a relay user equipment, wherein a symbol in a subframe in which the control signal is transmitted is first one or two symbols in the subframe, and the radio resource includes symbols located after the one or two symbols in the subframe.

3. The method of claim 1, wherein the radio resource includes a plurality of contiguous resource blocks in the frequency domain.

4. The method of claim 3, wherein the guard subcarrier is included in the resource block adjacent to the frequency band allocated to the macro user equipment among the plurality of resource blocks.

5. A method of transmitting a signal of a relay station in a wireless communication system, the method comprising:

receiving backhaul resource allocation information from a base station; and transmitting at least one of backhaul uplink data and a control signal to the base station by using a radio resource indicated by the backhaul resource allocation information, wherein the radio resource includes a plurality of symbols in a time domain, and the plurality of symbols have boundaries which are shifted based on symbols included in a frequency band allocated to a macro user equipment, and wherein the radio resource includes a plurality of subcarriers in a frequency domain, and at least one subcarrier adjacent to the frequency band allocated to the macro user equipment among the plurality of subcarriers is set to a guard subcarrier in which the relay station transmits no signal.

6. The method of claim 5, wherein the radio resource includes a guard time in a first symbol of a subframe, and the guard time is shorter than one symbol.

7. The method of claim 6, wherein the subframe includes a guard time in a last symbol.

8. The method of claim 6, wherein when the frequency band allocated to the macro user equipment is included in the radio resource, at least one subcarrier located in a boundary of the frequency band allocated to the macro user equipment is not used for signal transmission of the macro user equipment.

9. The method of claim 5, wherein when the relay station transmits a backhaul sounding reference signal to the base station, the relay station transmits the backhaul sounding reference signal in another symbol other than a symbol in which the macro user equipment transmits a sounding reference signal.

10. A relay station comprising:

a radio frequency (RF) unit for transmitting and receiving a radio signal; and a processor coupled to the RF unit, wherein the processor receives backhaul resource allocation information from a base station and receives backhaul downlink data from the base station by using a radio resource indicated by the backhaul resource allocation information, wherein the radio resource includes a plurality of symbols in a time domain, and the plurality of symbols have boundaries which are shifted based on symbols included in a frequency band allocated to a macro user equipment, and wherein the radio resource includes a plurality of subcarriers in a frequency domain, and at least one subcarrier adjacent to the frequency band allocated to the macro user equipment among the plurality of subcarriers is set to a guard subcarrier in which the base station transmits no signal.

* * * * *